United States Patent Office 3,024,115
Patented Mar. 6, 1962

3,024,115
METHOD OF MAKING A FONDANT-TYPE PRODUCT
Stevan Loncar, Jabuka, Yugoslavia, assignor to Industrija Skroba, Jabuka, Yugoslavia
No Drawing. Filed Feb. 23, 1960, Ser. No. 10,059
Claims priority, application Yugoslavia Feb. 21, 1959
8 Claims. (Cl. 99—134)

The present invention relates to a fondant-type product and to a method of making the same.

More particularly, the present invention is concerned with a cream-like, foamy, sugar-based product for use in the production of sweet goods.

Fondant-type products are conventionally produced in the household as well as in bakeries and large industrial establishments, by preparing a heavy viscous glucose and saccharose syrup mixture to which flavoring and/or coloring materials as well as limited quantities of other ingredients, for instance eggs and milk, may be added. This mixture is then beaten by hand or machine so as to obtain in end product of desired consistency. In actual operation, the process outlined above is rather involved, requires considerable labor and, on a larger than household scale, special machinery. Furthermore, if products of a cream-like consistency are desired, which are not supposed to solidify upon prolonged storage, further difficulties arise, since these products are of such limited stability that it is generally necessary to use each batch thereof shortly after its production has been completed.

It is therefore an object of the present invention to provide a method of producing a sugar-based edible product of durable, cream-like, foamy consistency.

It is another object of the present invention to provide a sugar-based edible product of durable, cream-like, foamy consistency.

It is a further object of the present invention to provide a method by which a sugar-based edible product of durable, cream-like, foamy consistency can be produced in a simple and economical manner.

Other objects and advantages of the present invention will become apparent from a further reading of the description and of the appended claims.

With the above and other objects in view, the present invention contemplates a method of producing a sugar-based edible product, comprising the steps of incorporating in a first syrup of predetermined viscosity an alkaline substance adapted to react with an acidic substance under formation of carbon dioxide, incorporating in a second syrup of predetermined viscosity an acidic substance adapted to react with the alkaline substance under formation of carbon dioxide, and forming a mixture of the first and second syrups so that the alkaline and acidic substances will react with each other under formation of carbon dioxide, the predetermined viscosities of the syrups and the relative quantities thereof being so chosen that the viscosity of the mixture will be such as to impede escape of the carbon dioxide therefrom, whereby a sugar-based edible product of durable foamy consistency is formed.

The method of the present invention may be carried out by forming a first homogeneous mixture of a first saccharose and glucose containing syrup of predetermined viscosity, an aqueous albumen solution containing an amount equal to between about 0.1% and 10% of the dry weight of the first syrup, and of an aqueous solution of a substance selected from the group consisting of sodium bicarbonate and potassium bicarbonate, the quantity of the substance being equal to between 1% and 15% of the dry weight of the first quantity of syrup, forming a second homogeneous mixture of a second saccharose and glucose containing syrup of predetermined viscosity the quantities of the first and second syrups being substantially equal, and of an aqueous solution of a fruit acid selected from the group consisting of citric acid and tartaric acid containing an amount of fruit acid equal to between about 1% and 15% of the dry weight of the second quantity of syrup, and forming an intimate mixture of the first and second homogeneous mixtures, so as to react said substance of the first mixture with the fruit acid of the second mixture thereby forming carbon dioxide, the predetermined viscosities of the first and second syrups being so chosen that ab initio the viscosity of the intimate mixture will be sufficiently high to substantially prevent for a prolonged period of time escape of carbon dioxide from the intimate mixture, whereby a sugar-based edible produce of durable foamy consistency is formed.

The present invention also contemplates as an article of manufacture the sugar-based edible product of durable foamy consistency produced as described above.

In the manner outlined above, the shortcomings of prior methods for preparing such sugar-based durable foamy cream products are overcome and a product is obtained which can be stored for prolonged periods of time without losing its cream-like foamy consistency.

Preferably, and this is advised in most cases, the portion of the syrup to which alkali, preferably a bicarbonate, has been added will also contain albumen which is introduced in the form of an aqueous solution.

It is also preferred, but not absolutely necessary, that the two glucose-saccharose syrup portions, to one of which bicarbonate and albumen and to the other of which citric acid or the like are to be added, are of the same composition.

It is of course also within the scope of the present invention to include flavoring or coloring additives which preferably will be added to the most suitable syrup portion prior to combining the alkali and acidic syrup portions. Frequently such additives will be incorporated in the syrup portion which also will contain the citric acid or the like.

While fruit acids and particularly tartaric and citric acid are preferred and seem to give best results for neutralizing the bicarbonate under formation of carbon dioxide, the present invention is not to be considered limited to these acids.

Thus, very good results are obtained and the operation is further simplified by forming two syrup portions of equal quantity and composition, adding citric or tartaric acid to one portion, bicarbonate and albumen to the other portion, and mixing the two portions together, whereby the relative quantities of acid and bicarbonate are so chosen as to release the maximum amount of carbon dioxide and forming an end product of desired pH.

The novel features which are considered as characteristic for the invention are set forth in particular in the appended claims. The invention itself, however, both as to its construction and its method of operation, together with additional objects and advantages thereof, will be best understood from the following description of specific embodiments.

A solution is made of saccharose having a desired concentration of between 1% and 50%. The concentration is adjusted, if desired, by adding water.

A solution of glucose is then made available. The viscosity of the glucose solution may be between 20° Bé. and 35° Bé. and the glucose on a dry basis between 30% and 90%.

Equal quantities of the syrups, i.e., the saccharose solution and the glucose solution are then introduced into an evaporator which may be steam heated and in which the mixture is evaporated under reduced pressure until a concentration of between 35° Bé. and 47° Bé. (at normal temperature) is reached. Evaporation is carried out in conventional manner under a residual pressure of between about 360 and 60 mm. Evaporation temperature also is controlled in conventional manner usually between about 20° C. and 90° C.

As soon as the desired concentration of the glucose-saccharose mixture has been reached in the evaporator, the mixture is withdrawn therefrom and passed in equal quantities into two jacketed vats which are provided with suitable stirring equipment.

It can be seen from the foregoing that the concentration of the syrup mixture as well as the percentage amounts of saccharose and glucose therein can be easily controlled by controlling the concentrations of the saccharose and glucose syrups. It is of course also possible to introduce the syrups into the evaporator in quantitative relationships other than 1:1. If the installation is connected with either a starch syrup or a sugar factory, it will be advantageous to introduce the respective syrup at such concentration at which it has attained the desired purity, and to adjust the concentration of the other syrup so that a homogeneous mixture will be formed in the evaporator.

A sodium or potassium bicarbonate solution is prepared, apart therefrom in a vessel which preferably contains a stirring device, an aqueous solution of albumen. The bicarbonate solution is then introduced under stirring into one of the syrup containing jacketed vats and the albumen solution is also introduced (at a temperature which may be between ambient temperature and 60° C.) into the same vat. Thus, in this vat a homogeneous mixture of bicarbonate and albumen-containing saccharose-glucose syrup will be formed.

Preferably the bicarbonate (dry basis) is added in a quantity equal to between 1% and 15% of the dry weight of the syrup to which it is added, and the albumen (dry basis) is added in a quantity equal to between 0.1% and 10% of the weight of the dry substance of the syrup. The syrup mixture in each of the jacketed vats will contain between 30% and 90% dry substance, depending on the desired consistency of the final product which also will be influenced by the amount of carbon dioxide which is freed upon mixing of the alkaline and acidic syrups from the two jacketed vats, and also by the addition of albumen.

The other half of the syrup mixture prepared in the evaporator flows into the other jacketed vat. In both vats the temperature is adjusted by indirect cooling or heating to the desired mixing temperature for the acidic and alkaline syrups.

An aqueous solution of citric or tartaric acid is prepared and introduced into the other jacketed vat. Preferably, the quantity of citric or tartaric acid will be equal to between 1% and 15% of the weight of the dry substance of the syrup to which it is admixed.

Flavoring agents and the like such as vanillin, coffee, raspberry extracts or the like, rum or rum flavor, etc. may be introduced into the acidified syrup. Generally the quantity of such flavoring additions equals between 0.05% and 2% of the dry substance of the syrup.

After thus adding all ingredients to the syrups in the two jacketed vats, thorough mixing is carried out until one vat contains a homogeneous bicarbonate and albumen containing syrup mixture and the other vat a homogeneous acid and possibly also flavoring ingredients containing syrup mixture.

Alternatively, it is also possible to introduce concentrated saccharose syrup in measured quantities from a storage facility directly into the jacketed vats and to introduce glucose syrup from another storage facility or from the evaporator into these vats, so that mixing of the glucose and saccharose syrups and consequent adjustment of viscosity to the desired Baumé will take place in the jacketed vats. The quantity of saccarose thus introduced, preferably will be equal to between about 10% and 50% of the glucose in the jacketed vats.

The syrup mixtures produced in the jacketed vats could be mixed immediately so as to form a cream-like, foamy, stable, sugar-based product. However, in most cases it will be desirable to fill the syrups from these vats into separate storage containers or barrels and to carry out the mixing of the alkaline and acidic syrups at the location where the cream-like, foamy product is needed. As containers suitable for storage and transportation, acid resistant plastic barrels have been advantageously used.

At the place of use, equal quantities of the consistent syrupy masses from each of the two jacketed vats or rather from barrels containing the two types of syrups are mixed, whereby the bicarbonate of the alkaline syrup will react with the acid of the acidic syrup under formation of carbon dioxide and thereby a thick consistent mass of foamy structure having a volume which for instance (and preferably) will be equal to four times the combined volumes of the alkaline and acidic syrups, will be formed.

When blending the syrupy masses from barrels containing the two types of syrup, in this manner a foamy cream which in contact with air and under ambient conditions will be durable and resistant to deterioration for prolonged periods of time.

The process of the present invention also may be schematically indicated as per the following flow sheet:

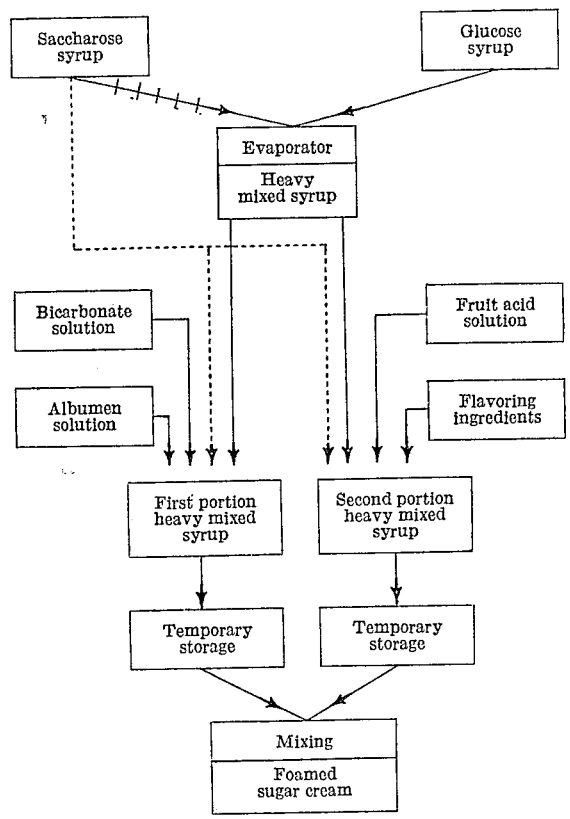

Without limiting the present invention to the specific data given below, certain preferred conditions for carrying out the present invention will be found in the following table.

TABLE

Glucose-saccharose syrup in the jacketed vats:
　Temperature—between room temperature and 60° C.
　Baumé—between 35° and 47°
　Saccharose in percent of total dry substance—between 10% and 50%
Alkalinized syrup:
　Sodium or potassium bicarbonate in percent of total dry substance—between 1% and 15%
　Albumen in percent of total dry substance—between 0.1% and 10%

Acidified syrup: Citric or tartaric acid in percent of total dry substance: between 1% and 15% (and at least in the stoichiometric quantity required for liberation of all of the carbon dioxide from an equal quantity of alkalinized syrup from the other vat The following example is given as illustrative only, the present invention, however, not being limited to the specific details of the example.

*Example*

A syrup mixture is prepared having a Baumé of 40° and containing on a dry basis two parts glucose for one part saccharose.

This syrup is divided into two equal portions which are maintained at a temperature of about 50° C.

To one portion, a concentrated sodium bicarbonate solution is added in such quantity that the total amount of sodium bicarbonate equals 8% of the dry weight of this syrup portion. In addition, an albumen solution having a temperature of close to 60° C. is added in such quantity that the amount of albumen equals 4% of the dry weight of this syrup portion. A homogeneous mixture is produced by stirring.

To the other syrup portion, a solution of citric acid is added in such quantity that the amount of citric acid introduced in this manner equals 8% of the dry weight of this syrup portion. A homogeneous mixture is produced by stirring.

The thus produced two homogeneous portions are stored separately.

When required, equal quantities of the two homogeneous portions are mixed together and mixing is continued until a homogeneous, thick, cream-like, foamy product is formed. If the two portions appear too stiff for thorough mixing, heating may be carried out to a limited extent. At higher temperatures mixing is facilitated, however, the amount of carbon dioxide lost during the mixing and reaction period will increase with rising temperatures. Therefore, preferably mixing is carried out at ambient temperatures or temperatures up to about 40° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a sugar-based edible product, comprising the steps of incorporating in a first syrup of predetermined viscosity an alkaline substance adapted to react with an acidic substance under formation of carbon dioxide; incorporating in a second syrup of predetermined viscosity an acidic substance adapted to react with said alkaline substance under formation of carbon dioxide; and forming a mixture of said first and second syrups so that said alkaline and acidic substances will react with each other under formation of carbon dioxide, said predetermined viscosities of said syrups and the relative quantities thereof being so chosen that the viscosity of said mixture will be such as to impede escape of said carbon dioxide therefrom, whereby a sugar-based edible product of durable foamy consistency is formed.

2. A method of producing a sugar-based edible product, comprising the steps of incorporating in a first portion of a syrup of predetermined viscosity an alkaline substance adapted to react with an acidic substance under formation of carbon dioxide; incorporating in a second portion of said syrup an acidic substance adapted to react with said alkaline substance under formation of carbon dioxide; and forming a mixture of said first and second syrup portions so that said alkaline and acidic substances will react with each other under formation of carbon dioxide, said predetermined viscosity of said syrup being so chosen that the viscosity of said mixture will be such as to substantially prevent for a prolonged period of time escape of said carbon dioxide therefrom, whereby a sugar-based edible product of durable foamy consistency is formed.

3. A method of producing a sugar-based edible product, comprising the steps of incorporating in a first syrup of predetermined viscosity an alkaline substance adapted to react with an acidic substance under formation of carbon dioxide; incorporating in a second syrup of predetermined viscosity an acidic substance adapted to react with said alkaline substance under formation of carbon dioxide, one of said syrups consisting essentially of an aqueous solution of saccharose and glucose; and forming a mixture of said first and second syrups so that said alkaline and acidic substances will react with each other under formation of carbon dioxide, said predetermined viscosities of said syrups and the relative quantities thereof being so chosen that the viscosity of said mixture will be such as to impede escape of said carbon dioxide therefrom, whereby a sugar-based edible product of durable foamy consistency is formed.

4. A method of producing a sugar-based edible prodtion of carbon dioxide; incorporating in a second syrup of between about 35° and 47° Bé. an alkaline substance adapted to react with an acidic substance under formation of carbon dioxide; incorporating in a second syrup of predetermined viscosity an acidic substance adapted to react with said alkaline substance under formation of carbon dioxide, said first and second syrups being of about equal quantity; and forming a mixture of said first and second syrups so that said alkaline and acidic substances will react with each other under formation of carbon dioxide, said predetermined viscosities of said syrups and the relative quantities thereof being so chosen that the viscosity of said mixture will be such as to impede escape of said carbon dioxide therefrom, whereby a sugar-based edible product of durable foamy consistency is formed.

5. A method of producing a sugar-based edible product, comprising the steps of incorporating in a first syrup of predetermined viscosity an aqueous albumen solution and an alkaline substance adapted to react with an acidic substance under formation of carbon dioxide; incorporating in a second syrup of predetermined viscosity an acidic substance adapted to react with said alkaline substance under formation of carbon dioxide; and forming a mixture of said first and second syrups so that said alkaline and acidic substances will react with each other under formation of carbon dioxide, said predetermined viscosities of said syrups and the relative quantities thereof being so chosen that the viscosity of said mixture will be such as to impede escape of said carbon dioxide therefrom, whereby a sugar-based edible product of durable foamy consistency is formed.

6. A method of producing a sugar-based edible product, comprising the steps of forming a first homogeneous mixture of a first quantity of a saccharose and glucose containing syrup of predetermined viscosity, an aqueous albumen solution containing an amount of albumen equal to between about 0.1% and 10% of the dry weight of said first syrup, and of an aqueous solution of a substance selected from the group consisting of sodium bicarbonate and potassium bicarbonate, the quantity of said substance being equal to between 1% and 15% of the dry weight of said first quantity of syrup; forming a second homogeneous mixture of a second quantity of a saccharose and glucose containing syrup of predetermined viscosity, and of an aqueous solution of a fruit acid containing an amount of fruit acid equal to between about 1% and 15% of the dry weight of said second quantity of syrup, and forming an intimate mixture of said first and second homogeneous mixtures, so as to react said substance of said first mixture with said fruit acid of said second mixture thereby forming carbon dioxide, said predetermined viscosities of said first and second syrups, being so chosen that ab initio the viscosity of said intimate mixture will be sufficiently high to substantially prevent for a prolonged period of time escape of carbon dioxide from said intimate mixture, whereby a sugar-based edible product of durable foamy consistency is formed.

7. A method of producing a sugar-based edible product, comprising the steps of forming a first homogeneous mixture of a first saccharose and glucose containing syrup of predetermined viscosity, an aqueous albumen solution containing an amount of albumen equal to between about 0.1% and 10% of the dry weight of said first syrup, and of a aqueous solution of a substance selected from the group consisting of sodium bicarbonate and potassium bicarbonate, the quantity of said substance being equal to between 1% and 15% of the dry weight of said first quantity of syrup; forming a second homogeneous mixture of a second saccharose and glucose containing syrup of predetermined viscosity the quantities of said first and second syrups being substantially equal, and of an aqueous solution of a fruit acid selected from the group consisting of citric acid and tartaric acid containing an amount of fruit acid equal to between about 1% and 15% of the dry weight of said second quantity of syrup, and forming an intimate mixture of said first and second homogeneous mixtures, so as to react said substance of said first mixture with said fruit acid of said second mixture thereby forming carbon dioxide, said predetermined viscosities of said first and second syrups being so chosen that ab initio the viscosity of said intimate mixture will be sufficiently high to substantially prevent for a prolonged period of time escape of carbon dioxide from said intimate mixture, whereby a sugar-based edible product of durable foamy consistency is formed.

8. In a method of producing a sugar-based edible product, the steps of incorporating in a first sugar syrup of at least about 35° Bé., a predetermined quantity of a substance selected from the group consisting of sodium bicarbonate and potassium bicarbonate; and incorporating in a second sugar syrup of at least about 35° Bé. a quantity of an acid selected from the group consisting of citric acid and tartaric acid, the quantity of said acid being at least sufficient to react with all of said predetermined quantity of said bicarbonate, whereby upon mixing together of said syrups, carbon dioxide will be formed by reaction between said bicarbonate and said acid, and a sugar-based edible cream-like product of durablee foamy consistency will be formed.

References Cited in the file of this patent

UNITED STATES PATENTS

| | | |
|---|---|---|
| 1,384,319 | Heath | July 12, 1921 |
| 1,601,302 | Farley | Sept. 28, 1926 |
| 2,899,318 | Long | Aug. 11, 1959 |